United States Patent [19]
Kindig

[11] 3,913,373
[45] Oct. 21, 1975

[54] METHOD AND APPARATUS FOR FORMING WINDING END TURNS

[75] Inventor: Alan L. Kindig, Holland, Mich.

[73] Assignee: General Electric Company, Fort Wayne, Ind.

[22] Filed: Jan. 14, 1974

[21] Appl. No.: 433,268

[52] U.S. Cl. .................. 72/355; 29/205 D; 29/596; 72/393
[51] Int. Cl.² ......................................... B21D 22/00
[58] Field of Search .................. 29/596, 606, 205 D; 72/353, 355, 393; 310/42

[56] References Cited
UNITED STATES PATENTS

| | | |
|---|---|---|
| 2,506,173 | 5/1950 | Polard............................... 29/205 D |
| 2,980,157 | 4/1961 | Rediger............................. 29/596 |
| 3,593,405 | 7/1971 | Hahn ................................ 29/205 D |

*Primary Examiner*—Carl E. Hall
*Attorney, Agent, or Firm*—Ralph E. Krisher

[57] ABSTRACT

Method includes substantially independently selectively forming a number of different arcuately disposed regions of at least one end turn envelope. Apparatus includes spaced-apart activated end turn forming members that preselectively compress predetermined and spaced-apart regions of an end turn bundle to provide a final desired shape and configuration of the end turn bundle. Means are provided for quickly and reliably changing the extent to which predetermined portions of an end turn bundle is to be shaped and formed.

9 Claims, 6 Drawing Figures

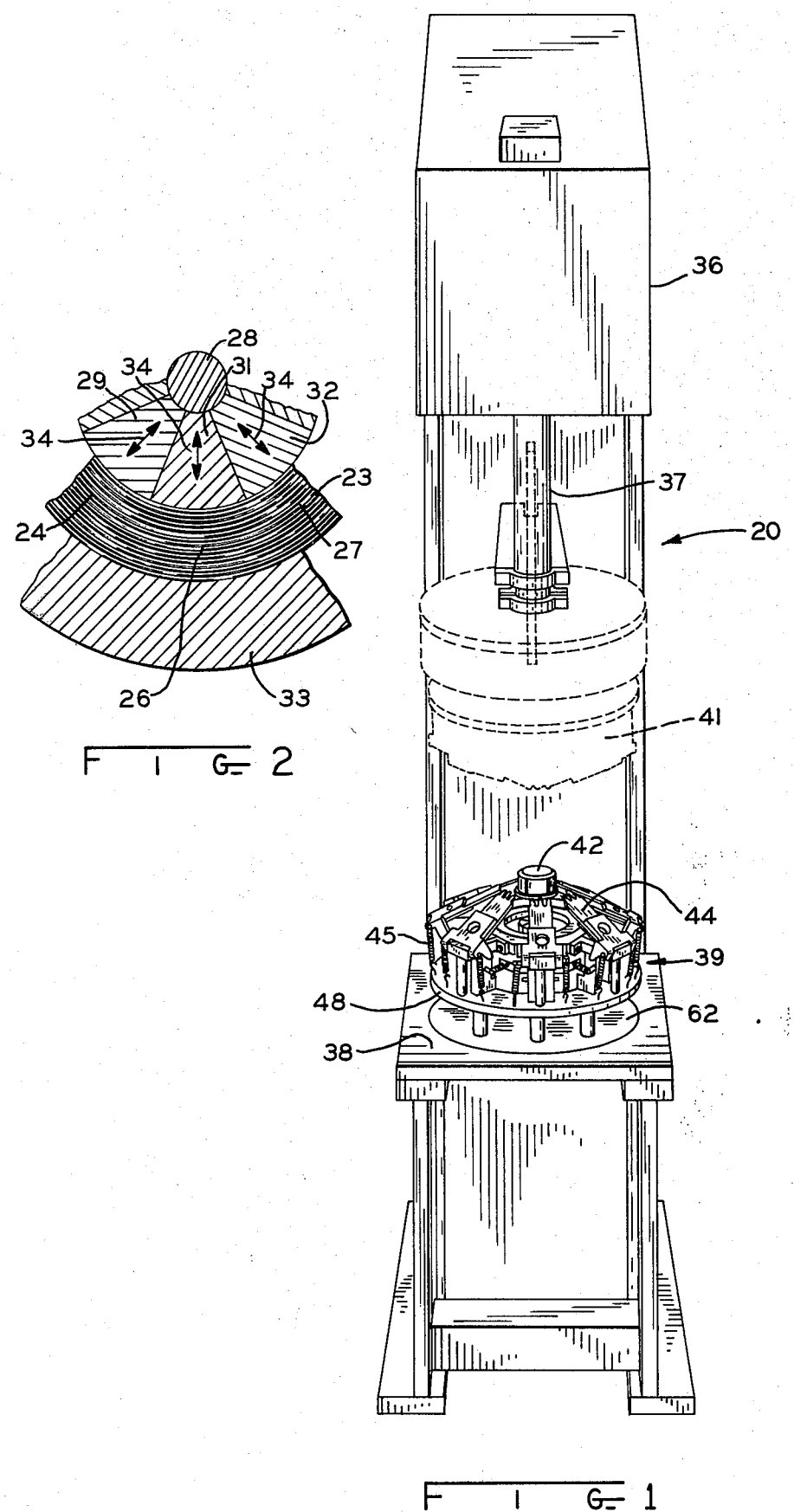

METHOD AND APPARATUS FOR FORMING WINDING END TURNS

BACKGROUND OF THE INVENTION

The present invention relates to methods and apparatus for forming winding end turns and, more particularly, for establishing the final form and shape of end turn portions of windings supported on a magnetic core, such as the stator core of a dynamoelectric machine.

In many conventional dynamoelectric machines, for example, such as fractional horsepower induction motors, a magnetic stator core is provided with a rotor receiving bore having radially extending winding receiving slots positioned outwardly of the bore. A predetermined number of turns of insulated wire conductor are arranged within such slots to form the excitation windings of the motor. These coils have end turn portions extending outside the slots axially beyond the sides or end faces of the stator core.

As is taught in Hahn U.S. Pat. No. 3,593,405, which issued July 20, 1971 (and which is owned by the assignee of this application and the entire disclosure of which is specifically incorporated herein by reference), it is highly desirable to shape or form winding end turn portions into a compact mass adjacent a core face. By way of illustration, in the case of a stator assembly comprising a magnetic core and winding as shown and described in Hull U.S. Pat. No. Re. 26,788 which issued Feb. 10, 1970 (and which also is assigned to the assignee of the present application and the entire disclosure of which also is incorporated herein by reference), the end turn portions of windings may be laced or tied together before and/or after being pressed or formed. Lacing or tying winding end turns may be accomplished, for example, with apparatus as illustrated in Gawthrop et al. U.S. Pat. No. 3,659,337 which issued May 2, 1972. This patent also is assigned to the assignee of the present application and the entire disclosure of this patent also is incorporated herein by reference.

It will be understood that a purchaser of a stator assembly motor may specify or require that the configuration (or "envelope") of the winding end turn portions thereof be of a particular size and shape. Such size and shape may be attained by pressing and compacting the winding end turn portions.

For a number of different reasons, there may be variations (from stator to stator) as to the amount or volume of material present at a particular region of an end turn envelope. For example, space for a thermostatic device may be required in one region of an end turn envelope, while other regions of the envelope may include connections between external lead wires and a winding tap wire (or one or more connections between two or more winding sections or coils). Also, due to the distribution of winding turns on a stator core, some regions of an end turn envelope may include the end turn portions of a relatively great number of winding turns whereas a region of the envelope spaced therefrom may include the end turn portions of a relatively lesser number of winding turns. For example, one region may accommodate end turn portions of both auxiliary and main phase windings, while another region accommodates only portions of one of the phase windings. It also should be noted that, the location of envelope regions having a large number of end turn portions may vary from stator design to stator design. For example, the arrangement of an auxiliary phase winding in non-quadrature relationship to a main phase winding often will change the location of a "tight" envelope region as compared to a stator having main and auxiliary phase windings arranged in a quadrature relationship.

In one approach that has been followed heretofore, a core and coil assembly is assembled as, for example, described in the above-referenced Hull patent. Thereafter, but prior to lacing or binding the end turn portions, such portions are initially shaped with apparatus such as that disclosed in the above-referenced Hahn patent. Subsequent to such initial pressing, the end turn portions are laced (e.g., with equipment such as that illustrated in the above-referenced Gawthrop et al. patent). Thereafter, presses that are known as "roll presses" have been used to "touch-up" the end turn envelope.

The just described approach has been less than fully satisfactory for all applications since a roll press tends to uniformly press the entire internal diameter of the end turn envelope. Moreover, damage to wires or wire insulation may occur with relative ease during a roll press operation.

Accordingly, it will be understood that it would be desirable to provide a method of pressing end turn portions whereby preselected regions of an end turn envelope may be pressed with a predetermined force. More particularly it would be desirable to provide a method whereby selected regions of an end turn envelope may be pressed in different amounts. These desirable approaches would be of particularly great benefit when working with stator assemblies comprising windings made from aluminum material since, for a given motor design, a greater volume of end turn material is present in the case of aluminum windings as compared to copper windings. Of course, it also would be desirable to provide apparatus capable of practicing the just mentioned desirable method in an economical and facile manner.

It is, therefore, an object of the present invention to provide improved methods for forming and shaping winding end turns.

It is another object to provide improved methods for substantially independently forming and shaping winding end turns in preselected regions of an end turn envelope.

It is a further object of the present invention to provide apparatus capable of carrying out the above objects.

It is a still further and more specific object of the present invention to provide improved apparatus which may be utilized to substantially independently selectively form and shape a number of preselected regions of an end turn envelope.

It is yet another object of the present invention to provide new and improved apparatus that may be quickly and readily adjusted to preselectively compact, or press and form, selected regions of at least one end turn envelope.

A still further object of the present invention is to provide improved methods and apparatus whereby substantially different pressing operations may be formed substantially simultaneously at opposite end faces of the stator core so as to establish a relatively precise and preselected final end turn configuration.

SUMMARY OF THE INVENTION

In carrying out the above and other objects of the invention in one form thereof, I provide an improved method that includes the steps of substantially independently selectively forming a number of different regions of an end turn envelope.

In one preferred form of apparatus capable of use during practice of the invention and embodying certain aspects of the invention in another form, I provide a number of spaced apart activated end turn forming members that preselectively compress predetermined and spaced apart regions of an end turn bundle. This provides a final desired shape and configuration of the end turn bundle. In one form of apparatus illustrated herein, means are provided for quickly and reliably changing the extent to which predetermined portions of an end turn bundle are to be shaped and formed.

BRIEF DESCRIPTION OF THE DRAWINGS

The subject matter which I regard as my invention is particularly pointed out and distinctly claimed in the concluding portion of this specification. My invention, itself, however, both as to its organization and preferred mode of operation, together with further advantages thereof, may be better understood by reference to the following description taken in connection with the accompanying drawings of one form of apparatus embodying certain aspects of my invention and which may be used to practice my invention.

In the drawings:

FIG. 1 is a perspective view (with parts removed, parts broken away, and parts shown in phantom) of one form of apparatus embodying aspects of my invention and which may be utilized to practice my invention in one form;

FIG. 2 is a plan view (with parts broken away and parts removed) of a stator assembly positioned in the apparatus of FIG. 1, and illustrates the performance of one preferred method;

DESCRIPTION OF THE PREFERRED EMBODIMENT

Figure 3:
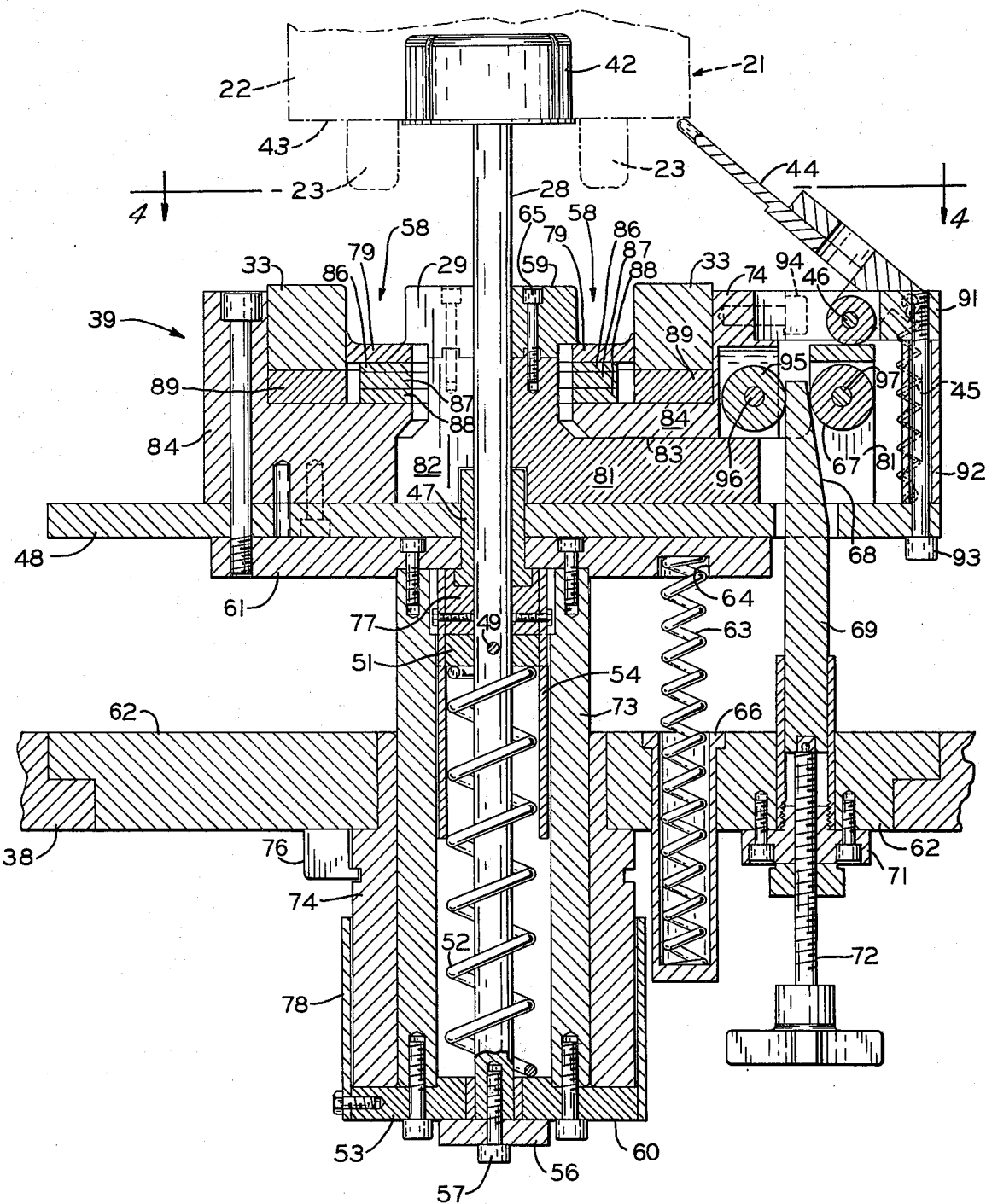
FIG. 3 is a view in elevation (with parts removed, parts broken away, and parts shown in section) of a portion of the apparatus shown in FIG. 1.

Referring now to the drawings in more detail, FIG. 1 illustrates the general construction of a complete apparatus 20 that may be used to practice my invention in one preferred form.

FIG. 2 is presented for the purpose of describing one mode of practicing the invention. With initial reference to FIG. 3 and then to FIG. 2, a stator assembly 21 comprises a magnetic core 22 and windings that include end turn portions arranged in an end turn envelope 23. With particular reference to FIG. 2, and with the "background" discussion regarding end turn envelopes in mind, it will be appreciated that in many situations it is desirable to selectively press or form spaced apart regions of the end turn envelope 23.

In practicing my invention in one preferred form, I selectively form and shape spaced apart regions 24, 26, and 27 of the end turn envelope 23. Moreover, I substantially independently perform a pressing or compacting operation along each of these spaced apart regions and, preferably, may press each of these regions a predetermined amount. It should be understood, however, that when desired, any two of the illustrated regions 24, 26, 27 (or in fact all three of such regions) may be formed or pressed the same amount.

It should also be understood that the stator assembly 21 includes an end turn envelope at each end face of the core, and that in the practice of my method in one preferred form thereof, I may substantially independently press regions of end turn envelopes along each of the core end faces. This may be accomplished sequentially or substantially simultaneously at each end face of the core.

With continuing reference to FIG. 2, a portion of the apparatus 20 is illustrated in order to at least schematically depict performance of a preferred method. The details of the apparatus illustrated in FIG. 2 are discussed in more detail hereinafter and, accordingly, elements of apparatus 20 that are shown in FIG. 2 will for the moment merely be referred to by reference numeral and name.

The center line of the apparatus 20 runs along the center or axis of shaft 28. A number of movable pressing tool segments 29, 31, and 32 are operable to move in a radial direction relative to the center of shaft 28 so as to selectively and substantially independently press or form the spaced apart regions 24, 26, 27 of the end turn envelope 23 against a stationary forming ring 33. As will be better understood from the following detailed discussion, I may selectively adjust the extent of radial travel of all of the movable tool segments of apparatus 20 so that the distance which they travel in the direction of the arrows 34 may be controlled in a predetermined fashion. Thus, the extent or amount of compaction and forming that is accomplished along each of the spaced-apart regions of the end turn envelope 23 may be controlled in a predetermined manner.

Turning once again to FIG. 1, the apparatus 20 includes a conventional press frame 36 that includes a head portion having a movable driven upper member 37 and a lower stationary plate 38. Supported on the stationary plate 38 is a lower tooling assembly 39, while a movable upper tooling assembly 41 is suspended for movement in response to movement of the upper driven member 37. The lower and upper tooling assemblies 39 and 41 are substantially identical, and for ease of illustration, only the lower tooling assembly 39 has been illustrated in detail herein. It will be understood, however, as the following description proceeds, that the discussion of lower tooling assembly 39 is equally pertinent to the description of the upper tooling assembly 41. However, it also should be noted that when only one end turn envelope along one end face of a core is to be finally formed and pressed, either the upper or lower tooling assembly 39, 41 may be replaced by a relatively simple reaction member or surface. Essentially the only difference between the assemblies 39 and 41 is that the lower assembly 39 illustrated in FIG. 1 includes locating means in the form of a stator assembly locating seat 42 and a subassembly associated therewith whereas a corresponding support and subassembly has been omitted from the upper tooling assembly 41.

Turning now to FIG. 3, the sequence of operations that preferably are to be followed in order to utilize apparatus 20 in the practice of my invention will be described. The stator assembly 21 is first loaded or placed onto the seat 42. Then, as the driven upper member of apparatus 20 drives the upper tooling assembly downwardly towards the upper end face of the stator assembly 21, the stator assembly 21 is urged downwardly as viewed in FIG. 3 which in turn causes the stator assembly seat 42 to move downwardly and force shaft 28 in the same direction, all as viewed in FIG. 3. During this initial phase of operation, the end face 43 of the stator assembly 21 engages the fingers of a number of substantially identical cuff supports 44 and causes them to swing downwardly about their pivot shaft cuff assembly supporting shaft 46. As this occurs, cuff support return springs 45 are placed under increased tension and, accordingly, elongate. It will be understood that cuff support members are provided on the upper tooling assembly and therefore engage the upper face of the stator assembly in the same fashion as the cuff supports 44.

As the end turn envelope 23 moves downwardly (still having reference to FIG. 3) the shaft 28 moves through a guide bushing 47 which at all times remains stationary relative to base plate 48. The shaft 28, by means of a pin 49 drives a guide flange 51 in a direction to compress spring 52 against a reaction surface of a cap member 53.

Guide flange 51 is provided with a pair of radially extending slots along the outer periphery thereof, and these slots accommodate a pair of longitudinally extending guides or keys 54. The guides or keys 54 are prevented from rotation about the axis of shaft 28 (as will be discussed in more detail hereinafter) and thus prevent rotation of guide flange 51 and shaft 28 relative to plate 48. As shaft 28 moves downwardly in FIG. 3, a stop member 56 moves away from the surface 60 of the cap member 53. It will be noted that the stop member 56 is secured to shaft 28 by means of a fastener that has been illustrated as a screw 57.

The stator assembly 21 continues to move downwardly relative to base plate 48 until the end turn envelope 23 is accommodated in a pocket region 58 of the tooling assembly 39. This pocket region is defined by the stationary forming ring 33 and a plurality of movable tool segments 29, 59, etc. The upper and lower tooling assemblies continue to move relative to one another until the opposite end faces of the stator assembly 21 firmly engage and are stopped from further movement by reason of the cuff supports being firmly engaged against the stationary forming rings and by reason of bottom plate 61 bottoming out on tooling base plate 62.

As will be understood, the cuff supports 44 prevent crushing of the cuffs or ends of slot liners (or other insulation) that may be provided to insulate the stator windings from the stator core 22.

During relative movement of tooling assemblies 39 and 41, the lower tooling assembly 39 is moved downwardly as viewed in FIG. 3 until bottom plate 61 engages and comes to rest against tooling base 62. At this time, the spaced apart regions of end turn envelope 23 will have been finally formed and configured in the desired fashion. As bottom plate 61 moves toward base plate 62, a number of tooling return springs 63 are compressed. These springs 63 assist in returning various parts of the tooling assembly 41 to the free position thereof shown in FIG. 3 at the end of a machine cycle. It will be noted that springs 63 are constrained to remain in an operative position by seats 64 formed in the bottom plate 61, and seats that are defined by spring retaining tubes 66 that are pressed into the base plate 62.

As the end face 43 of the stator assembly forces the cuff supports 44 into engagement with the stationary forming rings 33, and forces the base plate 48 and bottom plate 61 toward tooling base plate 62, a number of rollers 67 are each forced to ride along a camming surface 68 of respective ones of actuating members 69. These actuating members are held in an adjustably fixed position relative to the tooling base plate 62 by means of bushing assemblies 71 which threadably receives an adjusting member 72. The bushing assemblies 71 are fastened to the base plate 62 as revealed in FIG. 3. During movement of bottom plate 61, guide post 73 moves downwardly through a guide bushing 74; the guide bushing being held to tooling base plate 62 by means of a number of toe clamps 76. As bottom plate 61 moves toward the tooling base plate 62, a guide 77 moves downwardly relative to shaft 28 (which previously has moved downwardly). The keys 54 also are constrained to move downwardly with the guide 77. It will be noted that guide 77 is trapped and held against movement relative to bottom plate 61 by a clamping ledge that is formed in the guide post 73.

Viewing the lower-most portion of the structure shown in FIG. 3, it will be appreciated that, at least momentarily during a machine cycle, the cap member 53 may be spaced from the bottom end of guide bushing 74. In order to prevent inadvertent admission of an object between the upper face of the cap 53 and the lower end of the guide bushing 74, a cylindrically shaped guard 78 is provided which moves telescopically relative to the guide bushing 74.

The active portions of the tooling assembly 39, that is, the acting and reacting portions of tooling assembly 39, comprise the stationary forming ring 33, the movable tooling segments 29, 59, etc., and a forming plate or ring 79. FOr a given tooling setup, the forming ring 33 and forming plate 79 are not movable relative to the bottom plate 61. However, the movable tooling segments 29, 59 move radially relative to the center of the tooling assembly and are constrained for such movement by carriers 81, 82.

With particular reference to carrier 81, it will be noted that the carrier is mounted for sliding radial movement between plate 48 and a surface portion 83 of housing 84. Radial movement of carrier 81 (and thus tooling segment 59 which is fastened thereto by screw 65) takes place as roller 67 is forced radially outwardly as it rides along the camming surface 68. The extent or amount of radial or lateral movement of carrier 81 (and thus tooling segment 59) depends upon the position of the actuating member 69 (shown in FIG. 3) relative to tooling base 62. This relative position may be adjustably determined by the adjusting member 72, which may be turned to move an actuating member 69 axially along a bushing assembly 71. For completeness of description, it is noted that a number of relative loosely retained ring spacers 86, 87, 88 and a spacer ring 89 are provided to establish desired dimensional relationships between the stationary forming ring 33, the forming plate 79, and the movable tooling segments 29, etc. The forming ring 33; spacers 86–89; tool segments 29, 59, etc.; and cuff supports 44 all may be quickly replaced by similar elements of different dimensions in order to change the tooling assembly and thereby accommodate differently sized stator assemblies or differently sized end turn envelopes.

It will be noted that the cuff support shafts 46 are supported by means of cuff support plates 91 which are spaced from plate 48 by means of a spacer 92 and fastened therewith by a screw 93. The cuff support plates 91 also are fastened to the housing 84 by means of screws 94.

Figure 4:
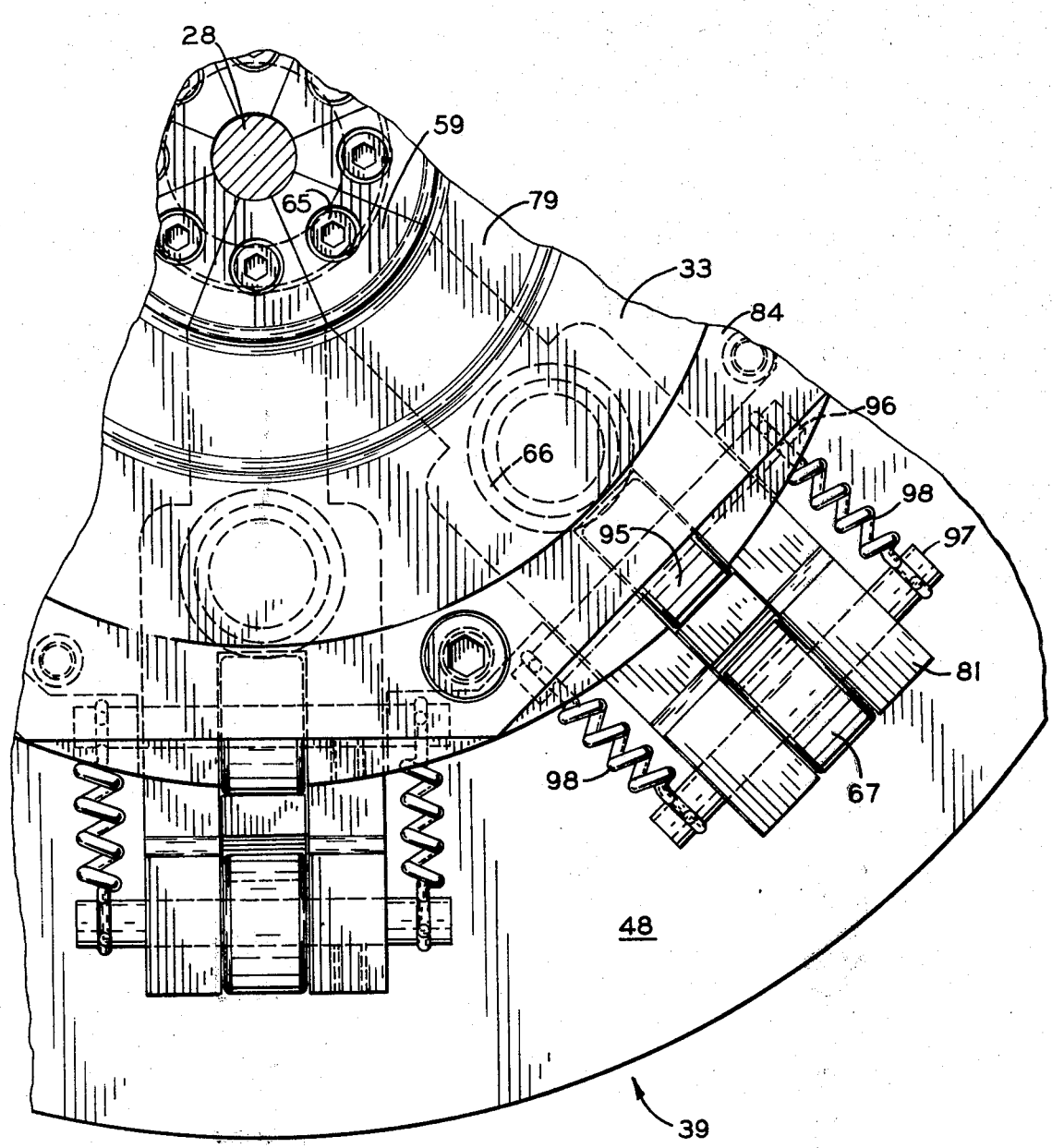
FIG. 4 is a plan view (with parts removed and parts broken away) taken in the direction of the lines 4—4 in FIG. 3, assuming FIG. 3 to have been shown in full.

It will be appreciated that the actuating members 69 may be subjected to substantial stresses during operation of the illustrated apparatus. In order to reinforce the actuating members, I have provided reinforcing or reaction rollers 95 on shafts 96 which in turn are supported by the housing 84. The actual shape and configuration of the parts of the tooling assembly 39 that are shown in FIG. 3 may be better appreciated by now comparing FIG. 3 with FIGS. 4–6. With initial reference to FIG. 4 it will be noted that the shaft 97 for roller 67 is carried in by arm portions of the carrier 81. Moreover, springs 98 extend between the shafts 96, 97 and ensure that shafts 97 will return to the relative position shown in FIG. 3 and thus return movable tooling segments 29, 59, etc. to their initial or "rest" positions at the end of each machine cycle.

Figure 5:
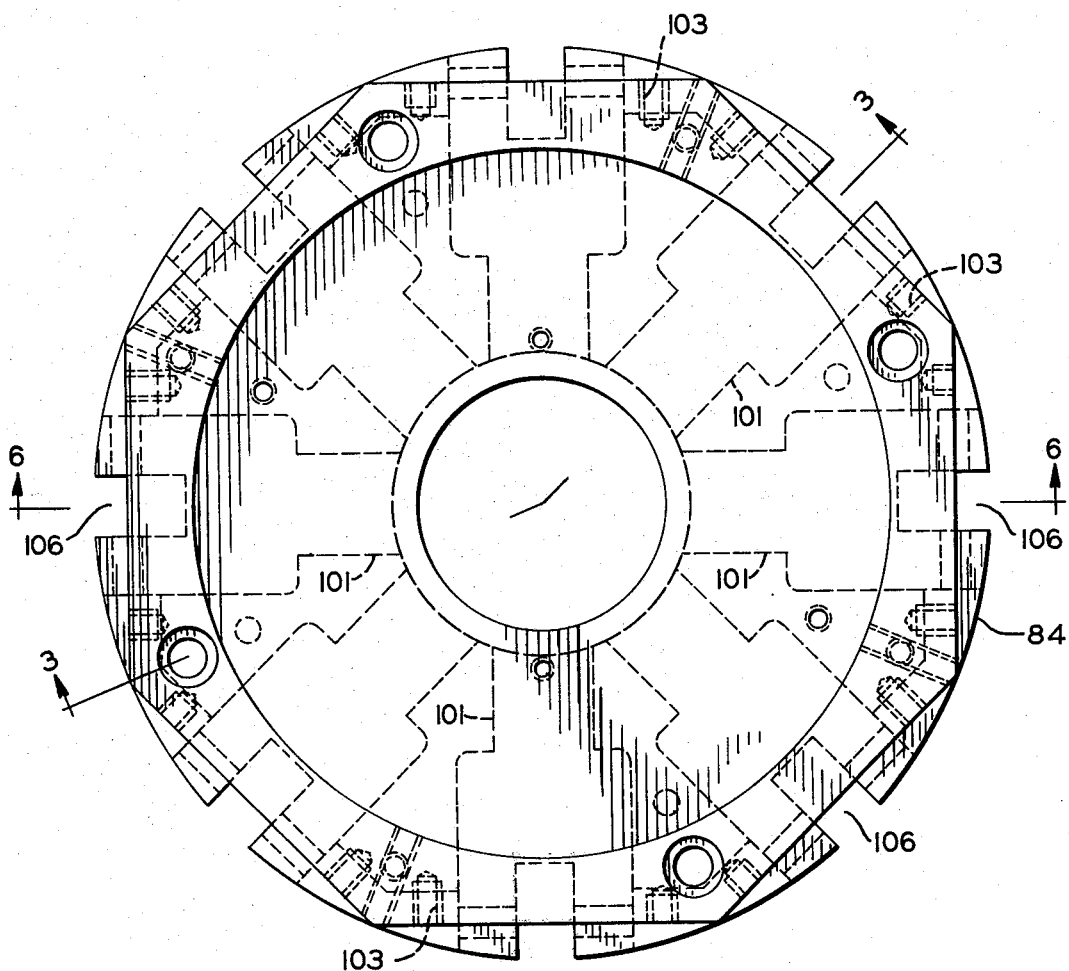
FIG. 5 is a plan view of a portion of the structure shown in FIGS. 1, 3, and 4, with the arrows 3—3 indicating the general direction of the view shown in FIG. 3.
Figure 6:
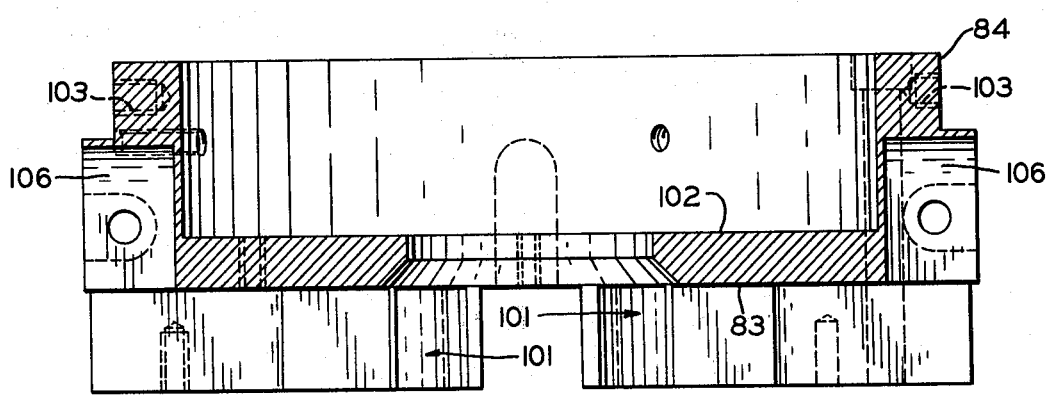
FIG. 6 is a view taken in the direction of arrows 6—6 on FIG. 5.

FIGS. 5 and 6 are plan and cross-sectional views, respectively of the housing 84. These views better illustrate the shape and configuration of the housing member 84 as well as the direction in which the view of FIG. 3 is taken. It will be understood that the location of bolt holes and other openings in the housing 84 have been shown only for purposes of illustration.

Carriers, such as carriers 81, 82, are accommodated in machined areas 101 of the housing 84, while spacers 88, 89, rest on surface 102 of the housing. Threaded openings 103 receive bolts or screws 94 (as will be understood); while recessed areas 106 in housing 84 will accommodate rollers 95.

In view of the foregoing, it should now be understood that I have illustrated and described herein one form of apparatus that may be used to practice my invention in one preferred form. Moreover, it should now be understood that a number of different spaced-apart regions of an end turn envelope may be independently conformed to a desired dimensional configuration. In the case of the illustrated apparatus 20, the end turn envelopes of a stator assembly at each end of the core may be pressed substantially independently in a predetermined manner in each of eight different arcuate regions. This is accomplished of course by providing eight separate actuating members, each complete with an adjusting member 72 in each of the tooling assemblies 39, 41.

While practicing my method, it will be understood that spacers, movable tool segments, and stationary forming rings are selected for a given size end turn envelope (within a workable range). Then, assuming that winding connections are buried in just one arcuate region of the end turn envelope, it might be necessary to adjust only one of the adjusting members 72 such that only that single region of the end turn envelope will be worked upon by a movable tooling segment (for example, tooling segment 29 as viewed in FIG. 2).

On the other hand it may be assumed that several separated regions of an end turn envelope should be formed to a final configuration. In this event, spaced-apart different ones of the adjusting members 72 may be turned so as to preset or predetermine the extent of movement of a movable tooling member and, thus, predetermine the extent to which the several spaced-apart preselected regions of the end turn envelope will be compressed.

While the present invention has been described by reference to preferred modes of practicing the invention and preferred embodiments of apparatus, it will be understood that modifications may be made by those skilled in the art without actually departing from the invention.

What I claim as new and desire to secure as Letters Patent of the United States is:

1. A method of establishing a predetermined desired form and shape of at least part of an arcuately extending envelope of at least part of a plurality of end turn portions of a number of turns of wire supported adjacent to at least one end face of a magnetic core, said method comprising substantially independently and substantially simultaneously selectively pressing preselected arcuately displaced regions of the envelope to respectively predetermined locations by (1) engaging each of the preselected arcuately displaced regions with a separately movable tool segment with each movable tool segment being movable an independently predetermined amount so that different arcuately displaced regions of the envelope will be compacted to different extents upon movement of the tool segments associated therewith; and (2) thereafter moving each tool segment its respective independently predetermined amount to establish the desired form and shape of the envelope.

2. The method of claim 1 comprising the steps of substantially simultaneously establishing the form and shape of at least portions of an end turn envelope adjacent each of two end faces of a stator core.

3. A method of forming at least preselected regions of an end turn envelope along at least one end face of a magnetic core and coil assembly, the method comprising: substantially independently and substantially simultaneously selectively forming and compressing arcuately spaced apart regions of the end turn envelope by (1) engaging such arcuately spaced-apart regions with arcuately spaced apart and separately movable tool segments that may be moved different amounts; and (2) conforming the dimensions of the arcuately spaced-apart regions of the end turn envelope to desired configurations relative to the magnetic core by moving at least two different arcuately spaced apart tool segments independently determined predetermined different amounts.

4. A method of establishing the form and shape of at least part of an arcuately extending envelope of at least part of a plurality of end turn portions of a number of turns of wire supported adjacent to at least one end face of a magnetic core, said method comprising substantially simultaneously selectively pressing preselected arcuate regions of the envelope varying amounts so as to establish respectively predetermined configurations for the arcuate regions, including substantially independently pressing each of the arcuate regions by the varying amounts.

5. The method of claim 4 comprising the steps of substantially simultaneously establishing the form and shape of at least portions of an end turn envelope adjacent each of two end faces of a stator core.

6. Apparatus for forming and shaping winding end turns associated with a magnetic core, said apparatus comprising a plurality of spaced apart tooling members that are engagable with spaced-apart portions of the winding end turns and that are movable in independently predetermined amounts, means for preselectively and independently determining relative movements of the spaced apart tooling members, and means for simultaneously forcing the independently movable tooling members against the winding end turns and moving respective ones of the tool members respective independently determined amounts, whereby spaced-apart portions of the winding end turns are pressed different amounts.

7. Apparatus for forming at least one end turn envelope established at least in part by end turn portions of a number of winding turns supported on a magnetic core, said apparatus including: a machine frame having at least one end turn forming tooling assembly supported thereon; said at least one end turn forming tooling assembly comprising a plurality of relatively movable end turn pressing tools; and means, including a number of actuating members, for moving said pressing tools relative to the frame and in a radial direction relative to a core to effect pressing of at least one preselected region of the end turn envelope a predetermined amount relative to another region of the end turn envelope, said actuating members being relative adjustable and being associated with different pressing tools so that the pressing tools may be moved different predetermined and independently determined amounts by an associated actuating member.

8. The apparatus of claim 7 wherein the pressing tools form part of a movable tooling assembly and the apparatus includes a relatively stationary assembly having the aforesaid number of actuating members associated therewith, each of the actuating members cooperating with a separate pressing tool to effect movement thereof during relative movement of the movable tooling assembly and the relatively stationary assembly.

9. The apparatus of claim 8 wherein the pressing tools are each coupled with at least one roller and the actuating members each include at least one camming surface; relative movement of a roller and a camming surface causing an associated movement of a pressing tool coupled with said roller.

* * * * *